United States Patent Office 3,035,969
Patented May 22, 1962

---

3,035,969
CARBAMATE-PYRETHRIN INSECTICIDES
Robert J. Hartle, Gibsonia, and Helen I. Thayer, Pittsburgh, Pa., assignors to Gulf Research & Development Company, Pittsburgh, Pa., a corporation of Delaware
No Drawing. Filed May 1, 1958, Ser. No. 732,145
8 Claims. (Cl. 167—24)

This invention relates to insecticidal compositions.

The widespread use of pyrethrum extracts or pyrethrins as insecticides attests to their insecticidal properties. However, because of their high cost, it is desirable to employ with the pyrethrins, materials which enhance their insecticidal action and thereby obtain greater economy in the preparation of insecticidal compositions.

We have found that the effectiveness of insecticidal compositions containing pyrethrin insecticide toxicants can be materially increased by the incorporation therein of certain N-monosubstituted carbamic acid esters. Thus, the present invention provides improved insecticidal compositions comprising a pyrethrin insecticide toxicant, a solvent therefor and the herein disclosed N-monosubstituted carbamic acid esters.

The N-monosubstituted carbamic esters which substantially enhance the insecticidal properties of pyrethrins are represented by the general formula:

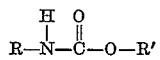

wherein R is an alkyl or cycloalkyl group containing between 3 and 16 carbon atoms and R' is an organic group or more particularly, R' is an alkyl, cycloalkyl, aryl, aralkyl, alkaryl or heterocyclic group with or without additional substituents such as sulfate, sulfonyl, phosphate, nitrate, nitro, nitroso or other group. Thus, for example, the R substituent may be an alkyl or cycloalkyl group such as n-propyl, isopropyl, n-butyl, isobutyl, amyl, isoamyl, cyclopentyl, cyclohexyl, heptyl, octyl, iso-octyl, nonyl, decyl, dodecyl, pentadecyl, or hexadecyl group and R' may be an alkyl or cycloalkyl group such as methyl, ethyl, n-propyl, iso-propyl, n-butyl, iso-butyl, amyl, cyclopentyl, cyclohexyl, heptyl, octyl, iso-octyl, nonyl, decyl, dodecyl, tetradecyl, pentadecyl, hexadecyl, heptadecyl, an aryl group such as phenyl, benzyl, naphthyl, cyclohexylphenyl, cinnamyl, tetramethyltetrahydronaphthyl, phenanthryl, thymyl, dichlorophenyl, indanyl or a heterocyclic group such as pyridyl, piperonyl (3,4-methylenedioxybenzyl), sesamyl (3,4-methylenedioxyphenyl), furfuryl, tetrahydrofurfuryl and the like. Preferred are those compounds wherein the sum of the carbon atoms in the R and R' substituent is 8 or more.

Representative esters of the invention include methyl N-propylcarbamate, ethyl N-amylcarbamate, n-butyl N-cyclopentylcarbamate, cyclohexyl N-decylcarbamate, octyl N-dodecylcarbamate, pentadecyl N - nonylcarbamate, phenyl N-isopropylcarbamate, phenyl N-isooctylcarbamate, 2,4-dichlorophenyl N-decylcarbamate, benzyl N-cyclohexylcarbamate, naphthyl N-decylcarbamate, 2(5,5,8,8) tetramethyltetrahydronaphthyl N-heptylcarbamate, cyclohexylphenyl N-n-butylcarbamate, 4-indanyl N-heptylcarbamate, 5 - indanyl N - pentadecylcarbamate, 3,4-methylenedioxyphenyl N-decylcarbamate, 3,4-methylenedioxyphenyl N-hexylcarbamate, piperonyl N-dodecylcarbamate, furfuryl N-decylcarbamate, tetrahydrofurfuryl N-heptylcarbamate.

The carbamate esters which according to this invention have been found suitable for enhancing the insecticidal activity of pyrethrins can be made by any one of several known methods. For example, the carbamates embraced by the above general formula can be prepared by the addition of a monohydroxy alcohol or phenol to an isocyanate or by reaction between an amine and the chloroformate derivative of a suitable monohydroxy alcohol or phenol. The method described in United States Patent No. 2,677,-698 may also be employed to prepare the carbamate esters of the invention.

The reaction of a monohydroxy alcohol or phenol with an isocyanate may be illustrated by the following equation:

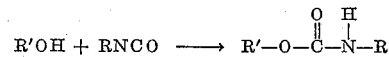

wherein R and R' have the same meaning as previously indicated.

The preparation of the carbamate esters by reaction of the chloroformate derivative of a monohydroxy alcohol or phenol with an amine may be represented by the following equations:

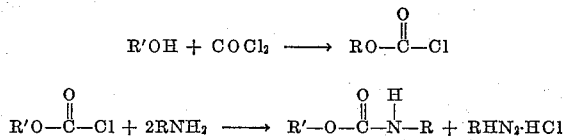

wherein R and R' have the same meaning as previously indicated.

The following example is illustrative of a method of preparing the class of compounds disclosed herein. It is understood that variations in reactants, proportions of ingredients, times of reaction, order of steps, and temperatures, may be resorted to when desirable.

EXAMPLE

The preparation of phenyl N-n-heptyl carbamate proceeded as follows:

A solution of 46 grams (0.7 mole) of sodium azide in 150 cubic centimeters of water was chilled to 8° C. in an ice bath. A solution of 81.3 grams (0.5 mole) of caprylyl chloride in 150 cc. of acetone was added dropwise with stirring at such a rate that the reaction temperature was maintained at 10–15° C. After addition was completed, stirring was continued for one hour. The two layers which formed were allowed to separate and the lower aqueous layer was completely removed through a syphon. The organic layer was then added dropwise to 500 cc. of hot (70° C.) benzene with rapid stirring. This temperature was maintained for 30 minutes after addition was completed. The mixture was allowed to cool, filtered and stripped of solvent at reduced pressure. The residual liquid was vacuum distilled to give a 76 percent yield of n-heptyl isocyanate, a liquid having a boiling point of 58–60° C./5.8 millimeters.

A solution of 7 grams (0.05 mole) of n-heptyl isocyanate, 4.7 grams (0.05 mole) of phenol, and two drops of piperidine, in 25 cubic centimeters of toluene was refluxed for 4–5 hours. After cooling, the reaction mixture was washed with dilute sodium acetate solution followed by a water wash. The organic phase was dried over sodium sulfate and filtered. Solvent and other volatiles were removed by heating at a temperature of 100° C. for several hours at reduced pressure, to give (in a yield above 90 percent) phenyl N-heptylcarbamate, a colorless liquid. Analysis.—Calculated for N: 5.78. Found, N: 5.96.

Any of the solvents commonly employed in insecticide compositions as solvents for pyrethrin insecticide toxicants can be employed in accordance with the present invention. These solvents include light petroleum fractions such as deodorized naphthas nad kerosenes, lubricating oils of light viscosity, aromatic hydrocarbons such as benzene, toluene, alkyl naphthalenes such as alpha-methyl naphthalene, acetone and alcohol.

Depending on the specific reactants employed to produce the carbamate esters included within this invention, the compounds of the invention vary in nature from liquids to crystalline solids. Some of the solid carbamates are ordinarily not too soluble in the petroleum oils conventionally employed as bases for insecticidal compositions but can be readily dissolved when a secondary solvent is used. Only very small amounts of secondary solvents are needed. Among the secondary solvents which may advantageously be used to increase the solubility of the additives are alcohols such as ethyl, isopropyl, butyl; ketones such as acetone, methyl ethyl ketone; and aromatic solvents such as toluene, xylene and benzene.

Relatively small quantities of the disclosed carbamate esters are employed in insecticide compositions to improve the killing effect of the pyrethrin insecticide toxicants. Improvement in kill is obtained by addition of the carbamate esters in amounts from about 10 milligrams/100 cubic centimeters solvent to about 2000 milligrams/100 cubic centimeters solvent. Preferred proportions of the additive are between 100 and 1000 milligrams/100 cubic centimeters of solvent. The most useful proportions of pyrethrins are between about 20 and about 2000 milligrams/100 cubic centimeters solvent.

In the following table, there is shown the enhancement of the insecticidal effect provided by representative carbamate esters of the invention. The fly killing test employed was the Barnhart Tower Test, or as it is commonly known, the Mist Tower method for testing insecticides. The Barnhart spray tower utilized in the test is adapted for the controlled application of a settling mist and consists of a vertical spray tower of two concentric celluloid cylinders. The dosage of spray is delivered by means of a deVilbiss artist's air brush as a fine mist. A slide permits the larger droplets to settle for a desired time to form a standard mist. The slide is then moved and the flies which are confined in paper dishes covered with wire screen, are exposed for a time to the standard mist. Sugar water solution is applied to the treated cage and the percent dead is determined 24 hours after treatment. This apparatus is described in detail in the 1941 issue of Soap and Sanitary Chemicals, volume No. 7, pages 105–115. The solvent employed was a deodorized light petroleum oil having a specific gravity of 0.78 and a distillation range of 380–480° F.

Table

| Compound | Percent Kill | | | |
|---|---|---|---|---|
| | Check Flies | Pyrethrins Alone, 50 mg./100 cc. solvent | Compound Alone, 1,000 mg./100 cc. solvent | 50 mg. pyrethrins + 1,000 mg. compound/ 100 cc. |
| Ethyl N-cyclohexyl-carbamate | 1.6 | 44.4 | 3.2 | 67.8 |
| Ethyl N-tert octylcarbamate | 1.6 | 44.4 | 2.2 | 59.0 |
| 5-indanyl N-isopropyl | 1.4 | 45.0 | 2.8 | 67.6 |
| "Oxo"¹ octyl N-n-butyl-carbamate | 1.4 | 30.2 | 1.8 | 49.4 |
| 5-indanyl N-n-butylcarbamate | 0.4 | 37.6 | 0.8 | 60.2 |
| phenyl N-heptylcarbamate | 1.2 | 36.4 | 1.4 | 72.0 |
| 5-indanyl N-heptylcarbamate | 8.8 | 53.4 | 9.4 | 86.8 |
| 4-indanyl N-heptylcarbamate | 8.8 | 53.4 | 9.4 | 87.6 |
| 2,4-dichlorophenyl N-heptylcarbamate | 1.0 | 68.8 | 2.6 | 89.4 |
| thymyl N-heptylcarbamate | 1.6 | 64.6 | ---------- | 83.6 |
| "Oxo"¹ octyl N-heptyl-carbamate | 0.4 | 47.4 | 2.8 | 74.4 |
| tetramethyltetra-hydronaphthyl N-heptylcarbamate | 0.2 | 48.4 | ---------- | 63.4 |
| 3,4-methylenedioxy phenyl N-butyl-carbamate (870 mg.) | 1.4 | 31.6 | ² 7.6 | ³ 96.8 |
| 3,4-methylenedioxy phenyl N-butylcarbamate (300 mg.) | 1.8 | 50.4 | ---------- | ³ 89.4 |
| 3,4-methylenedioxy benzyl N-butylcarbamate (870 mg.) | 2.0 | 31.6 | ² 4.6 | ³ 93.0 |
| 3,4-methylenedioxy benzyl N-butylcarbamate (300 mg.) | 1.8 | 50.4 | ---------- | ³ 80.4 |

¹ The alcohol reactant was derived from the Oxo process.
² The percent kill was obtained with 870 mg. of the compound.
³ The percent kill was obtained with 300 mg. of the compound.

It is seen from the above test results that the N-monosubstituted carbamic acid esters embraced by this invention exert no appreciable insecticidal effect themselves but materially enhance the killing power of pyrethrin insecticide toxicants. The use of the disclosed carbamates in insecticidal compositions containing pyrethrins is advantageous economically inasmuch as it makes possible a substantial reduction in the required amount of pyrethrins.

Compositions prepared in accordance with our invention are useful in combatting a variety of insect pests such as flies, moths, aphids, ants, roaches and the like.

Those modifications and equivalents which fall within the spirit of the invention and the scope of the appended claims are to be considered part of the invention.

We claim:

1. An insecticidal composition comprising a pyrethrin insecticide toxicant, a solvent therefor and a carbamate ester having the following formula:

$$R-\underset{\underset{H}{|}}{N}-\underset{\underset{O}{||}}{C}-O R'$$

wherein R is selected from the group consisting of alkyl and cycloalkyl groups containing from 3 to 8 carbon atoms and R' is selected from the group consisting of $C_2$ to $C_8$ alkyl groups, phenyl, dichlorophenyl, thymyl, indanyl and tetramethyltetrahydronaphthyl groups, said carbamate ester being present in the amount of from about 10 to about 2000 milligrams per 100 cubic centimeters of solvent and the ratio of said carbamate ester to the pyrethrin is about 6:1 to about 20:1.

2. The composition of claim 1 wherein said solvent is a hydrocarbon solvent.

3. The composition of claim 1 wherein the sum of the carbon atoms in the R and R' substituents of said carbamate ester is at least 8.

4. An insecticidal composition comprising a pyrethrin insecticide toxicant, a solvent therefor, and the compound 4-indanyl N-heptylcarbamate, wherein the carbamate is present in the amount from about 100 to about 1000 milligrams per 100 cubic centimeters of solvent and the ratio of the carbamate to the pyrethrin is about 6:1 to about 20:1.

5. An insecticidal composition comprising a pyrethrin insecticide toxicant, a solvent therefor, and the compound 5-indanyl N-heptylcarbamate, wherein the carbamate is present in the amount from about 100 to about 1000 milligrams per 100 cubic centimeters of solvent and the ratio of the carbamate to the pyrethrin is about 6:1 to about 20:1.

6. An insecticidal composition comprising a pyrethrin insecticide toxicant, a solvent therefor, and the compound octyl N-heptylcarbamate, wherein the carbamate is present in the amount from about 100 to about 1000 milligrams per 100 cubic centimeters of solvent and the ratio of the carbamate to the pyrethrin is about 6:1 to about 20:1.

7. An insecticidal composition comprising a pyrethrin insecticide toxicant, a solvent therefor, and the compound 2,4-dichlorophenyl N-heptylcarbamate, wherein the carbamate is present in the amount from about 100 to about 1000 milligrams per 100 cubic centimeters of solvent and the ratio of the carbamate to the pyrethrin is about 6:1 to about 20:1.

8. An insecticidal composition comprising a pyrethrin insecticide toxicant, a solvent therefor, and the compound thymyl N-heptylcarbamate, wherein the carbamate is present in the amount from about 100 to about 1000 milligrams per 100 cubic centimeters of solvent and the ratio of the carbamate to the pyrethrin is about 6:1 to about 20:1.

References Cited in the file of this patent

UNITED STATES PATENTS

| | | |
|---|---|---|
| 2,677,698 | Deutschman | May 4, 1954 |
| 2,856,411 | Prill | Oct. 14, 1958 |

OTHER REFERENCES

Frear: Chemistry of Insecticides, Fungicides and Herbicides, 2nd ed., 1948, D. Van Nostrand, pp. 144–156.

Wadley: The Evidence Required to Show Synergistic Action of Insecticides and a Short Cut in Analysis, U.S. Dept. of Agr. Bulletin ET–223, June 1945, pp. 1–7.

King: U.S. Dept. Agr. Handbook No. 69, May 1954, pp. 105–108.